(12) United States Patent
Büker et al.

(10) Patent No.: US 11,801,883 B2
(45) Date of Patent: Oct. 31, 2023

(54) MOUNTING UNIT FOR MOUNTING A STEERING SHAFT IN AN ASSOCIATED MOUNTING SLEEVE AND STEERING COLUMN ASSEMBLY

(71) Applicant: ZF Automotive Germany GmbH, Alfdorf (DE)

(72) Inventors: Richard Büker, Willich (DE); Andreas Birkheim, Cologne (DE)

(73) Assignee: ZF Automotive Germany GmbH, Alfdorf (DE)

( * ) Notice: Subject to any disclaimer, the term of this patent is extended or adjusted under 35 U.S.C. 154(b) by 0 days.

(21) Appl. No.: 17/532,068

(22) Filed: Nov. 22, 2021

(65) Prior Publication Data

US 2022/0177023 A1 Jun. 9, 2022

(30) Foreign Application Priority Data

Dec. 4, 2020 (DE) .................... 102020215345.0

(51) Int. Cl.
| | |
|---|---|
| *B62D 1/185* | (2006.01) |
| *B62D 1/19* | (2006.01) |
| *B62D 7/22* | (2006.01) |
| *F16C 3/03* | (2006.01) |
| *F16C 27/06* | (2006.01) |
| *B62D 1/16* | (2006.01) |

(52) U.S. Cl.
CPC .............. *B62D 1/185* (2013.01); *B62D 1/192* (2013.01); *B62D 7/224* (2013.01); *F16C 3/03* (2013.01); *F16C 27/063* (2013.01); *F16C 2226/12* (2013.01); *F16C 2226/74* (2013.01); *F16C 2326/24* (2013.01)

(58) Field of Classification Search
CPC .......... B62D 1/16; B62D 1/185; B62D 1/192; B62D 7/224; F16C 3/03; F16C 27/063; F16C 2226/12; F16C 2226/70; F16C 2226/74; F16C 2326/24
See application file for complete search history.

(56) References Cited

U.S. PATENT DOCUMENTS 3,501,208 A * 3/1970 Kessler .................. F16C 33/60
384/547
8,317,399 B2 * 11/2012 Spatschek ........... F16C 29/0695
384/57

FOREIGN PATENT DOCUMENTS

| DE | 102017213807 A1 * | 10/2017 | ............... B62D 1/16 |
| DE | 112018001017 T5 | 11/2019 | |
| WO | WO-2013004466 A1 * | 1/2013 | ............. B62D 1/185 |

(Continued)

OTHER PUBLICATIONS

Description translation for DE 112018/001017 from Espacenet (Year: 2019).*

(Continued)

*Primary Examiner* — Jason D Shanske
*Assistant Examiner* — Daniel M. Keck
(74) *Attorney, Agent, or Firm* — Kristin L. Murphy

(57) ABSTRACT

The disclosure relates to a steering system for a motor vehicle, which is designed as a steer-by-wire steering system and comprises a rack, an electric drive for longitudinal displacement of the rack, a worm gear and a drive shaft which is in toothed engagement with the rack. The electric drive is connected to the drive shaft by the worm gear so as to transmit torque.

16 Claims, 3 Drawing Sheets

(56) References Cited

FOREIGN PATENT DOCUMENTS

WO  WO-2014142821 A1 * 9/2014 ............... B62D 1/16

OTHER PUBLICATIONS

Description translation for WO 2013/1004466 from Espacenet (Year: 2014).*
Description translation for DE 102017/213807 from Espacenet (Year: 2017).*

* cited by examiner

MOUNTING UNIT FOR MOUNTING A STEERING SHAFT IN AN ASSOCIATED MOUNTING SLEEVE AND STEERING COLUMN ASSEMBLY

CROSS-REFERENCE TO RELATED APPLICATION

This application claims priority to German Patent Application No. 102020215345.0, filed Dec. 4, 2020, the disclosure of which is incorporated herein by reference in its entirety.

TECHNICAL FIELD

The disclosure relates to a mounting unit for mounting a steering shaft in an associated mounting sleeve, comprising an annular or substantially annular mounting body which extends around a central axis of the mounting body. The mounting unit further comprises at least two first mounting arms for radially supporting the mounting unit within the mounting sleeve, the two first mounting arms emanating from the mounting body and extending away from it. In addition, at least two second mounting arms are provided for radially supporting the mounting unit within the mounting sleeve, the two second mounting arms emanating from the mounting body, on a side opposite the first mounting arms, and extending away from it. The first mounting arms and the second mounting arms are resilient in the radial direction.

The disclosure also relates to a steering column assembly comprising a steering shaft and a mounting sleeve, the steering shaft being supported radially within the mounting sleeve by means of such a mounting unit.

BACKGROUND

Mounting units and steering column assemblies equipped therewith are known from the prior art. Known mounting units are used in particular to influence a vibration behavior of steering column assemblies equipped therewith in such a way that their characteristic frequencies or natural frequencies do not coincide with excitation frequencies that can occur during normal operation of a steering column assembly. In other words, mounting units of this type ensure that a steering column assembly can vibrate only slightly during operation. The mounting unit therefore serves to dampen or prevent vibrations in the broadest sense.

A problem occurs with such known mounting units and steering column assemblies equipped therewith. In particular, known mounting units need to be improved in terms of their assemblability and in terms of their production costs. Thus there is a need to provide a mounting unit that is easy to assemble and can be produced inexpensively overall. Of course, these improvements should not be achieved at the expense of vibration damping.

SUMMARY

In one exemplary arrangement, the problem may be solved by a mounting unit of the type as described above, in which a roller bearing is provided on a radially inner side of the mounting body for radially supporting the mounting unit on the steering shaft. In this exemplary arrangement, the mounting body forms an outer ring of the roller bearing on which rolling elements roll. The mounting body and the outer ring of the roller bearing are thus formed by a single component. As a result, the structure of the mounting unit is particularly simple, which results in simple assembly and low production costs overall.

Since the mounting unit is supported on a steering shaft via a roller bearing, the steering shaft can be rotated with little friction relative to the mounting unit. This relative movement is therefore particularly easy. Furthermore, support via a roller bearing is mechanically stable and reliable. This results in advantageous vibration behavior of a steering column assembly equipped with the mounting unit. In one exemplary arrangement, the characteristic frequencies of the steering column assembly can thus lie outside excitation frequencies that usually occur during operation of said assembly. The mounting unit therefore has the effect that a steering column assembly equipped therewith can be operated with little or no vibration.

In one exemplary arrangement, the mounting body can be closed around the circumference or have a circumferential interruption, for example in the form of a slot. In a second alternative, the roller bearing can have a cage for the rolling elements, so that rolling of the rolling elements over the circumferential interruption can reliably be ruled out.

In one exemplary arrangement, first mounting arms and second mounting arms integrally merge with the mounting body. Consequently, the mounting body, the first mounting arms and the second mounting arms are designed as a single component. It is therefore not necessary to mount the mounting arms on the mounting body. This results in low production costs for the mounting unit.

In one exemplary arrangement, the first mounting arms and the second mounting arms can extend substantially axially. In this context, the substantially axial extension of the mounting arms, in particular in relation to the central axis of the mounting body, is to be understood as meaning that the mounting arms extend predominantly axially. It goes without saying that said arms also extend in a radial direction in order to be able to fulfill their support function. However, the extension in the radial direction is small compared to the extension in the axial direction.

The mounting body and the outer ring which integrally merges with the mounting body can be made of a plastics material. The mounting body and the outer ring can thus be produced simply and inexpensively using standard production systems. This applies in particular to mass production of the mounting body and the outer ring that is integral therewith. Since the first mounting arms and the second mounting arms integrally merge with the mounting body, they are of course also made of plastics material. Steel balls or steel needles can be used as rolling elements.

Alternatively or additionally, an inner ring of the roller bearing and/or at least one rolling element of the roller bearing is made of a plastics material. The inner ring and/or the at least one rolling element can thus also be produced simply and inexpensively. In one exemplary arrangement, the entire roller bearing is constructed from plastics components. This makes it particularly inexpensive to produce.

For example, in this context, the entire mounting unit may be produced in a single injection molding process, in which the inner ring, the outer ring which integrally merges with the mounting ring and with any mounting arms provided thereon, and the rolling elements arranged between them are produced within a single mold. In this case, assembly steps for assembling the mounting unit can be completely omitted. As an alternative to this, the mounting unit can be produced using a generative manufacturing process. Even then, assembly steps can be completely omitted.

In one exemplary arrangement, at least one of the first mounting arms and/or at least one of the second mounting arms is substantially trapezoidal when viewed in the radial direction. In one exemplary arrangement, all the mounting arms are substantially trapezoidal when viewed in the radial direction. Such mounting arms are easy to produce. In addition, the resilient properties of the mounting arms can easily be realized in this way.

A radial projection can be arranged on at least one of the first mounting arms and/or at least one of the second mounting arms for contact with the mounting sleeve. In one exemplary arrangement, all mounting arms are provided with a radial projection. The mounting unit can then be placed easily and reliably on the mounting sleeve. This simplifies the mounting of the mounting unit on the mounting sleeve.

In one exemplary arrangement, the radial projection is formed by a circumferentially extending bead. Such a radial projection can be produced simply and inexpensively.

In one exemplary arrangement, the roller bearing is a ball bearing or needle bearing. The rolling elements are therefore spherical or needle-shaped. A ball bearing which only takes up a small amount of space can be used as a radial-axial bearing. As a result, the mounting unit is constructed so as to be compact overall.

In one exemplary arrangement, tolerance compensation elements are provided on a radially inner contact surface which is designed for putting the mounting unit and the steering shaft in radial contact. In one exemplary arrangement, deformable radial projections emanate from the radially inner contact surface. The inner contact surface may be provided on an inner ring of the roller bearing. The radial projections can be designed as axially extending ribs. If deformable radial projections are provided, tolerance compensation takes place by radial projections being deformed when the mounting unit is pushed onto the steering shaft. Consequently, precise and reliable placement of the mounting unit on the steering shaft is always ensured.

The proposed arrangements of the disclosure also serves to solve the problem of a steering column assembly of the type mentioned at the outset. More specifically, one exemplary arrangement of the disclosure provides for a steering shaft being mounted radially within the mounting sleeve by a mounting unit according to the disclosure. In one exemplary arrangement, the steering shaft and the mounting sleeve are axially displaceable relative to one another, so that the steering column assembly can be axially adjusted. Consequently, a reach adjustment can be made for a steering wheel connected to the steering column assembly. Such a steering column assembly also has advantageous vibration behavior due to the properties of the mounting unit explained above, such that it vibrates or oscillates only slightly during operation.

In one exemplary arrangement, an inner ring of the roller bearing can be held on the steering shaft by an interference fit. If tolerance compensation elements are provided, they may be deformed when the interference fit is formed. An interference fit can be produced simply and inexpensively. In addition, the inner ring of the roller bearing is reliably held on the steering shaft. Additional fastening elements are not necessary, and so the assembly of the mounting unit is simple and inexpensive.

The inner ring of the roller bearing can also be held axially on the steering shaft by a mechanical securing element. In one exemplary arrangement, such a securing element is a securing ring. In this way, too, the inner ring of the roller bearing can be reliably held on the steering shaft.

In one exemplary arrangement, the first mounting arms and the second mounting arms are in contact with the mounting sleeve under radial preloading. The steering shaft is thus held radially without play within the mounting sleeve. Any relative movements that may occur can be damped and/or geometrically compensated for by the mounting arms. Corresponding vibrations are also damped or avoided entirely.

BRIEF DESCRIPTION OF DRAWINGS

The disclosure is explained below with reference to two exemplary arrangements which are shown in the accompanying drawings, in which.

DETAILED DESCRIPTION

Figure 1:
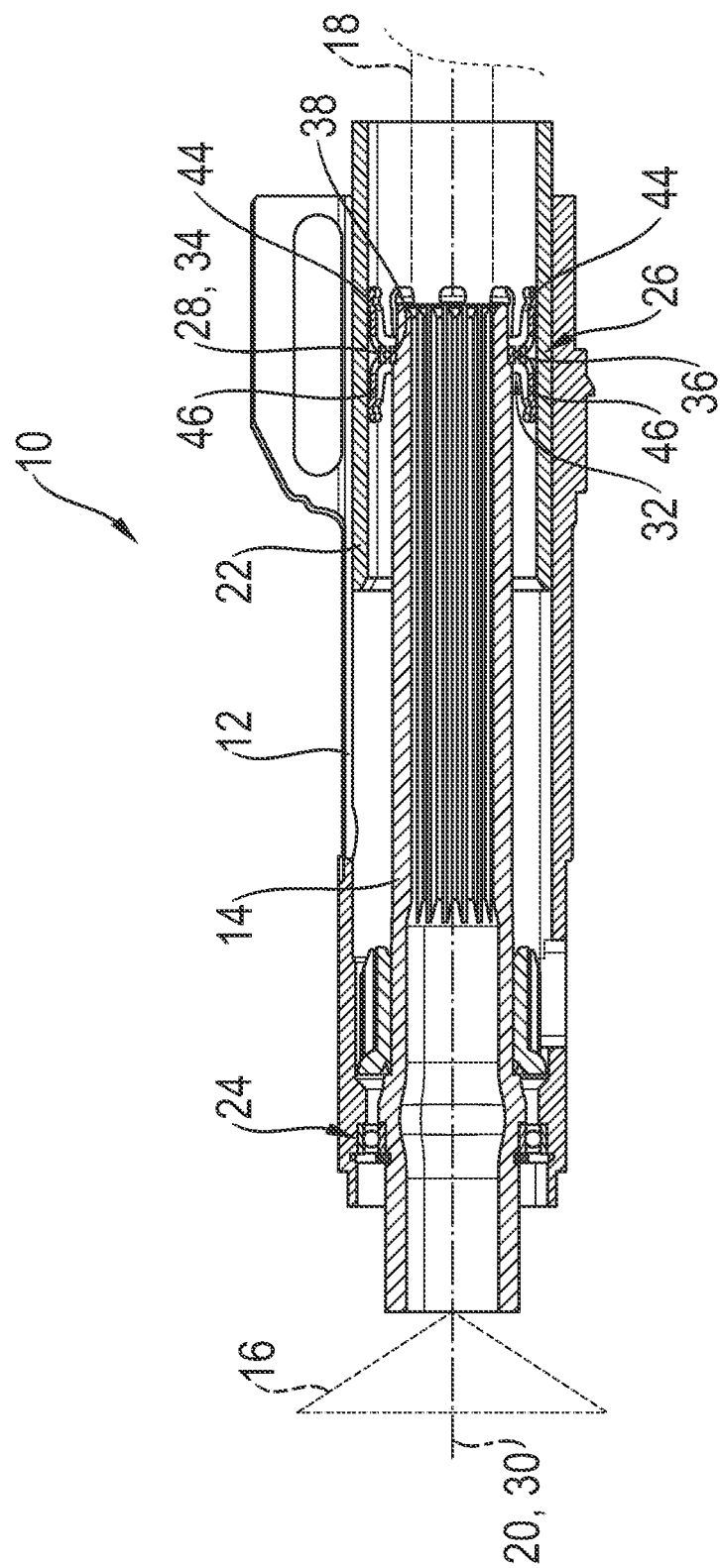
FIG. 1 shows a steering column assembly according to the disclosure with a mounting unit according to the disclosure in a sectional view.

FIG. 1 shows a steering column assembly 10.

Said assembly comprises a mounting housing 12 via which the steering column assembly 10 can be fastened in a motor vehicle (not shown in detail).

The steering column assembly 10 also has a steering shaft 14. In the exemplary arrangement shown, this is designed as a so-called upper steering shaft. This means that a steering wheel 16 (shown only schematically in FIG. 1) can be fastened to the steering shaft 14.

The steering shaft 14 is rotatably coupled to a further steering shaft 18, which is connected to the steering shaft 14 in a direction of a steering gear (not shown in detail). The steering shaft 14 and the further steering shaft 18 are axially displaceable relative to one another along an associated central axis 20 in order to ensure that a reach adjustment of the steering column assembly 10 is possible.

The steering column assembly 10 further comprises a mounting sleeve 22 which is arranged so as to be axially displaceable within the mounting housing 12. This, too, is used for the reach adjustment of the steering column assembly 10.

The steering shaft 14 is held radially and axially in the mounting housing 12 via a ball bearing 24.

In addition, the steering shaft 4 is mounted radially inside the mounting sleeve 22 by a mounting unit 26.

Figure 2:
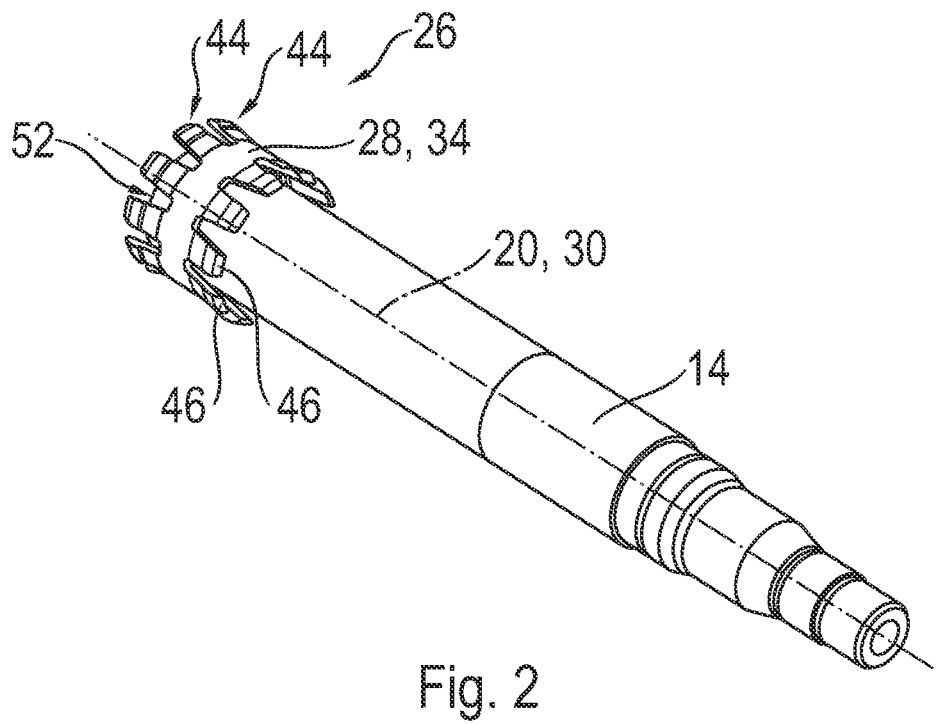
FIG. 2 shows a steering shaft and the mounting unit according to the disclosure of the steering column assembly from FIG. 1 in an isolated, perspective view.
Figure 3:
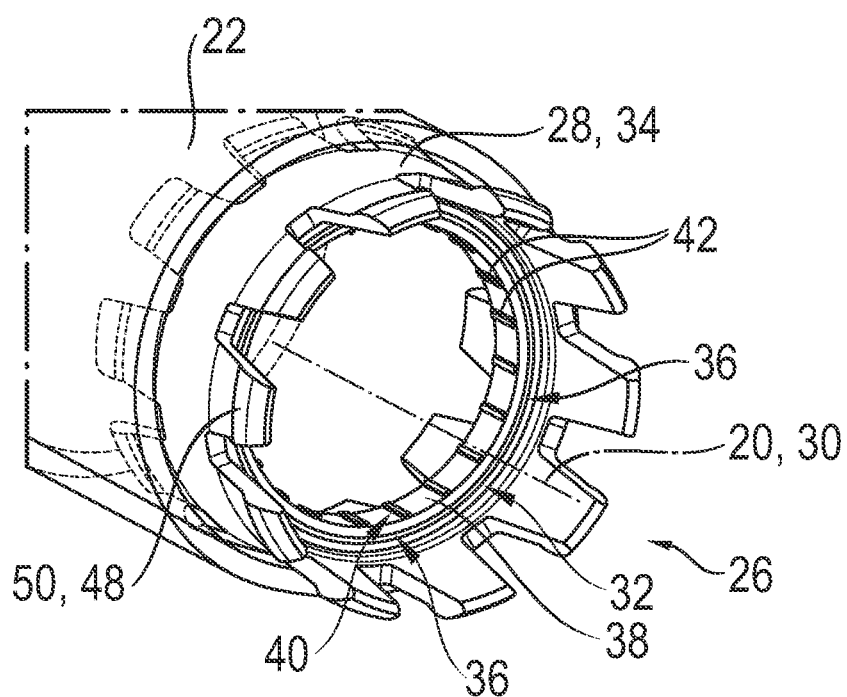
FIG. 3 shows the mounting unit according to the disclosure and a portion of a mounting sleeve of the steering column assembly from FIG. 1 in an isolated, perspective view.
Figure 4:
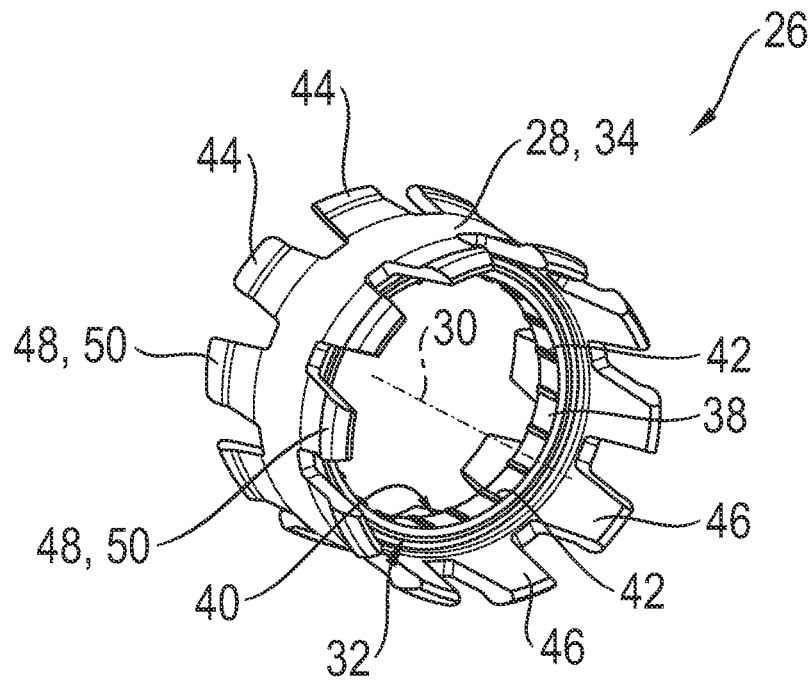
FIG. 4 shows the mounting unit according to the disclosure of the steering column assembly from FIG. 1 in an isolated, perspective view.

This mounting and the associated mounting unit 26 are shown in more detail in FIGS. 2 to 4.

The mounting unit 26 comprises a substantially annular mounting body 28 which extends around a central axis 30 of the mounting body (see e.g. FIG. 4).

In the exemplary arrangement shown, the central axis 30 of the mounting body coincides with the central axis 20.

On a radially inner side of the mounting body 28, a roller bearing 32 is provided which is designed as a ball bearing in the exemplary arrangement shown.

The mounting body 28 also forms an outer ring 34 of the roller bearing 32 on which associated rolling elements 36 roll. For the sake of clarity, only some of the rolling elements 36 are provided with a reference sign in FIG. 3.

The roller bearing 32 also comprises an inner ring 38. The rolling elements 36 also roll thereon.

Furthermore, a radially inner contact surface 40 is provided on the inner ring 38, via which surface the mounting unit 26 can radially contact the steering shaft 14.

In order to be able to compensate for any tolerances that may occur in this area, tolerance compensation elements 42 are provided on the contact surface 40, which in the exemplary arrangement shown are designed as deformable radial projections in the form of axially extending ribs.

In addition, a total of ten first mounting arms 44 and ten second mounting arms 46 emanate from the mounting body 28. In other words, the first mounting arms 44 and the second mounting arms 46 integrally merge with the mounting body 28.

For the sake of clarity, only some of the mounting arms are provided with a reference sign in FIG. 2 to 4.

The first mounting arms 44 emanate from the mounting body 28 on a first axial side thereof and the second mounting arms 46 emanate on a side opposite the first mounting arms 44.

Both the first mounting arms 44 and the second mounting arms 46 serve to radially support the mounting unit 26 within the mounting sleeve 22. For this purpose, they extend substantially axially.

It goes without saying that the first mounting arms 44 and the second mounting arms 46 also extend radially to a relatively small extent in order to be able to carry out the above-mentioned support function.

In addition, the first mounting arms 44 and the second mounting arms 46 are resilient in the radial direction.

In one exemplary arrangement, both the first mounting arms 44 and the second mounting arms 46 are substantially trapezoidal, viewed in the radial direction.

In addition, all of the mounting arms 44, 46 have, for contact with the mounting sleeve 22, a respectively associated radial projection 48 which, in the exemplary arrangement shown, is formed by a circumferentially extending bead 50.

Again, only a small number of radial projections 48 and beads 50 are provided with a reference sign.

In one exemplary arrangement, the mounting unit 26 is constructed entirely of plastics material.

Specifically, this means that the mounting body 28 with the mounting arms 44, 46 and the outer ring 34 integrally merging therewith are made of plastics material.

The inner ring 38 is also made of a plastics material. The rolling elements 36 are formed from steel in this case. Alternatively, it would be conceivable to also to form the rolling elements 36 from a plastics material.

The plastics material for the rolling elements 36 can be the same plastics material as used for the inner ring 38. Alternatively, the individual components can also be made from different plastics materials.

As mentioned above, the overall purpose of the roller bearing 32 is to support the mounting unit 26 on the steering shaft 14. For this purpose, in the assembled state of the mounting unit 26, the inner ring 38 is held on the steering shaft 14 via an interference fit 52.

In addition, the first mounting arms 44 and the second mounting arms 46 contact the mounting sleeve 22 under radial preloading.

In this way, in particular in connection with a reach adjustment of the steering column assembly 10, the mounting unit 26 is held at least radially on the steering shaft 14. The mounting unit 26 is displaceable in the axial direction relative to the mounting sleeve 22.

Figure 5:
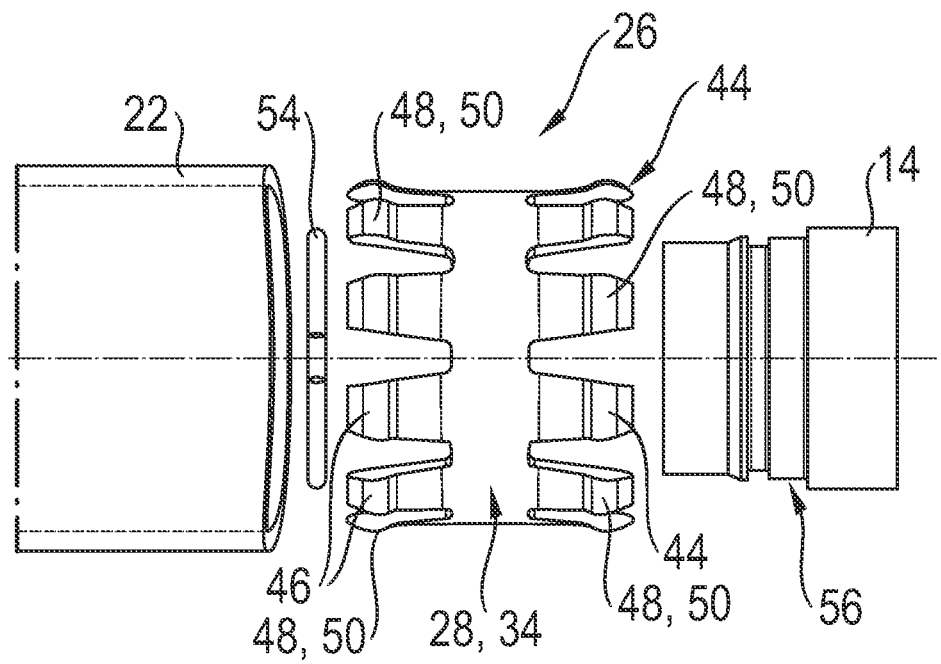
FIG. 5 shows a portion of a steering column assembly according to an alternative exemplary arrangement in an exploded view.

FIG. 5 shows a variant in which the mounting unit 26 is not held by an interference fit on the steering shaft 14, but instead is secured in the axial direction by a mechanical securing element 54 on a shaft shoulder 56 associated with the mounting unit 26, so that a mechanical lock is created.

Otherwise, this variant corresponds to the arrangement explained with reference to FIG. 1 to 4.

The invention claimed is:

1. A mounting unit for mounting a steering shaft in an associated mounting sleeve, comprising an annular mounting body which extends around a central axis of the mounting body,
   at least two first mounting arms for radially supporting the mounting unit within the mounting sleeve, the two first mounting arms extending from the mounting body and extending away from the mounting body, and
   at least two second mounting arms for radially supporting the mounting unit within the mounting sleeve, the two second mounting arms extending from the mounting body, on a side opposite the first mounting arms, and extending away from the mounting body,
   the first mounting arms and the second mounting arms being resilient in a radial direction,
   wherein a roller bearing is provided on a radially inner side of the mounting body for radially supporting the mounting unit on the steering shaft, the mounting body forming an outer ring of the roller bearing on which rolling elements roll,
   wherein deformable radial projections extending from a radially inner contact surface are provided thereon, the radially inner contact surface configured to place the mounting unit and the steering shaft in radial contact.

2. The mounting unit according to claim 1, wherein the first mounting arms and the second mounting arms integrally merge with the mounting body, and the first mounting arms and the second mounting arms extending axially therefrom.

3. The mounting unit according to claim 1, wherein the mounting body and the outer ring which integrally merges with the mounting body are made of a plastics material.

4. The mounting unit according to claim 1, wherein an inner ring of the roller bearing is made of a plastics material.

5. The mounting unit according to claim 4, wherein at least one rolling element of the roller bearing is made of a plastics material.

6. The mounting unit according to claim 1, wherein the deformable radial projections are formed by a circumferentially extending bead.

7. The mounting unit according to claim 1, wherein the roller bearing is a ball bearing or a needle bearing.

8. The mounting unit according to claim 1, wherein tolerance compensation elements are provided on the radially inner contact surface configured to place the mounting unit and the steering shaft in radial contact.

9. The mounting unit according to claim 1, wherein at least one of the first or the second mounting arms is trapezoidal when viewed in the radial direction.

10. The mounting unit according to claim 1, wherein the deformable radial projections are arranged on at least one of the first mounting arms and at least one of the second mounting arms for contact with the mounting sleeve.

11. The mounting unit according to claim 1, wherein a gap is positioned between adjacent first mounting arms and adjacent second arms.

12. A steering column assembly comprising:
a steering shaft; and
a mounting sleeve;
wherein the steering shaft is radially supported within the mounting sleeve by a mounting unit comprising an annular mounting body which extends around a central axis of the mounting body, at least two first mounting arms for radially supporting the mounting unit within the mounting sleeve, the two first mounting arms extending from the mounting body and extending away from the mounting body, and at least two second mounting arms for radially supporting the mounting unit within the mounting sleeve, the two second mounting arms extending from the mounting body, on a side opposite the first mounting arms, and extending away from the mounting body,
wherein the first mounting arms and the second mounting arms are resilient in a radial direction,
wherein a radial projection is arranged on at least one of the first mounting arms for contact with the mounting sleeve, and
wherein a roller bearing is provided on a radially inner side of the mounting body for radially supporting the mounting unit on the steering shaft, the mounting body forming an outer ring of the roller bearing on which rolling elements roll,
wherein deformable radial projections extending from a radially inner contact surface are provided thereon, the radially inner contact surface configured to place the mounting unit and the steering shaft in radial contact.

13. The steering column assembly according to claim 12, wherein an inner ring of the roller bearing is held on the steering shaft via an interference fit.

14. The steering column assembly according to claim 13, wherein the first mounting arms and the second mounting arms contact the mounting sleeve under radial preloading.

15. The steering column assembly according to claim 12, wherein an inner ring of the roller bearing is held axially on the steering shaft by a mechanical securing element.

16. The steering column assembly according to claim 12, wherein the first mounting arms and the second mounting arms contact the mounting sleeve under radial preloading.

\* \* \* \* \*